United States Patent
Hikiji et al.

(10) Patent No.: US 10,422,307 B2
(45) Date of Patent: Sep. 24, 2019

(54) AIR INTAKE MANIFOLD

(71) Applicants: NISSAN MOTOR CO., LTD., Yokohama-shi, Kanagawa (JP); MAHLE FILTER SYSTEMS JAPAN CORPORATION, Tokyo (JP)

(72) Inventors: Osamu Hikiji, Tokyo (JP); Tetsu Naito, Toda (JP)

(73) Assignees: NISSAN MOTOR CO., LTD., Yokohama-shi (JP); MAHLE FILTER SYSTEMS JAPAN CORPORATION, Tokyo (JP)

( * ) Notice: Subject to any disclaimer, the term of this patent is extended or adjusted under 35 U.S.C. 154(b) by 815 days.

(21) Appl. No.: 14/414,790

(22) PCT Filed: Jul. 17, 2013

(86) PCT No.: PCT/JP2013/069390
§ 371 (c)(1),
(2) Date: Jan. 14, 2015

(87) PCT Pub. No.: WO2014/014019
PCT Pub. Date: Jan. 23, 2014

(65) Prior Publication Data
US 2015/0176549 A1  Jun. 25, 2015

(30) Foreign Application Priority Data
Jul. 18, 2012  (JP) .................................. 2012-159212

(51) Int. Cl.
*F02M 35/10* (2006.01)
*F02M 35/104* (2006.01)
*F02B 29/04* (2006.01)

(52) U.S. Cl.
CPC ... *F02M 35/10268* (2013.01); *F02B 29/0462* (2013.01); *F02M 35/104* (2013.01); *F02M 35/10321* (2013.01); *Y02T 10/146* (2013.01)

(58) Field of Classification Search
USPC ...................................................... 123/184.61
See application file for complete search history.

(56) References Cited

U.S. PATENT DOCUMENTS

| 4,476,842 A | * | 10/1984 | Belsanti | .............. | F02B 29/0462 |
| | | | | | 123/563 |
| 2011/0088663 A1 | * | 4/2011 | Dehnen | ............... | F02B 29/0462 |
| | | | | | 123/542 |
| 2013/0263797 A1 | * | 10/2013 | Sugiura | ..................... | F01P 3/00 |
| | | | | | 123/41.01 |

FOREIGN PATENT DOCUMENTS

DE     199 02 504 A1    8/2000
DE  10 2009 025 282 A1  12/2010
(Continued)

*Primary Examiner* — Grant Moubry
*Assistant Examiner* — Ruben Picon-Feliciano
(74) *Attorney, Agent, or Firm* — Foley & Lardner LLP

(57) ABSTRACT

An intercooler (5) is received in an intercooler receiving portion (6) of an intake manifold (1) leaving a given space therebetween and longitudinally opposed walls (10a, 10b) of the intercooler receiving portion (6) are formed with ribs (11) to increase a mechanical strength thereof, so that, even when a heat exchanging device (5a) of the intercooler (5) is set in the intercooler receiving portion (6) having longitudinally opposed walls thereof placed close to the longitudinally opposed walls (10a, 10b) of the intercooler receiving portion (6), undesired contact or interference between mutually opposed ones of the longitudinally opposed walls is suppressed permitting a larger amount of intake air flow through a major portion of the heat exchanging device (5a) thereby causing increased cooling efficiency of the intercooler (5).

7 Claims, 6 Drawing Sheets

(56) References Cited

FOREIGN PATENT DOCUMENTS

| | | |
|---|---|---|
| JP | 58-148221 U | 10/1983 |
| JP | 60-76775 U | 5/1985 |
| JP | 2010-127143 A | 6/2010 |
| JP | 2012-082770 A | 4/2012 |
| JP | 2012-102667 A | 5/2012 |

* cited by examiner

AIR INTAKE MANIFOLD

TECHNICAL FIELD

The present invention relates to an intake manifold having an intercooler arranged therein.

BACKGROUND ART

Patent Document 1 shows an arrangement in which a water-cooled type intercooler is arranged in a serge tank of a resin made intake manifold. If, like this, an intercooler is installed to an intake manifold, a performance of a supercharger can be increased while reducing the entire volume of an air intake system.

In the water-cooled type intercooler, a plurality of metal members are combined by brazing or the like in a manner to constitute a watertight cooling water flow portion isolated from an intake air flow portion in which intake air flows. Accordingly, a mechanical strength of the brazed portions of the intercooler is lowered. Furthermore, a possible vibration applied to the intercooler tends to give adverse influence to portions where the mechanical strength is lowered. Thus, in case of installing an intercooler in a collector portion, it is preferable that the intercooler does not contact the intake manifold except the portions where the intercooler is actually fixed to the intake manifold.

Furthermore, in the resin made intake manifold, the thermal contraction of the resin tends to change depending on various conditions such as the season, weather, shape and thickness. Particularly in portions that are lowered in rigidity, variation of the deformation is increased, and thus it is difficult to correctly estimate a final shape of the resin made intake manifold.

Thus, in case of installing an intercooler in the resin made intake manifold, it is necessary to avoid interference or contact between the intercooler and the resin made intake manifold as less as possible even after the intake manifold is subjected to a deformation due to the thermal contraction and the like. For satisfying the necessity, it is necessary to set a rather large clearance between the intake manifold and the intercooler in advance.

However, the amount of intake air flowing through the clearance increases as the size of the clearance between the intake manifold and the intercooler increases, and thus, the amount of intake air that needs to flow in the intake air flow portion defined in the intercooler is reduced instead. This means that if the clearance is unnecessarily increased in size, the cooling performance of the intercooler to the intake air is lowered, which is an undesired matter.

PRIOR ART DOCUMENTS

Patent Document:
  Patent Document 1: Japanese Laid-open Patent Application (Tokkai) 2012-82770

SUMMARY OF INVENTION

Accordingly, an intake manifold according to the present invention is characterized in that, for the purpose of avoiding interference between an intercooler and the intake manifold, an intercooler receiving portion defined in the intake manifold for receiving therein the intercooler is formed at inner wall surfaces thereof with ribs that project toward an interior of the intercooler receiving portion.

According to the present invention, due to provision of the ribs on the inner wall surfaces of the intercooler receiving portion, the rigidity of the inner wall portions where the ribs are provided is increased and thus the variation of deformation of the ribs and the inner wall portions where the ribs are provided can be reduced. Accordingly, it becomes possible that a clearance between the intercooler and leading ends of the ribs can be reduced to such a minimum size as not to bring about interference (or contact) therebetween while increasing the air flow resistance at the clearance. Thus, undesired phenomenon in which the amount of intake air flowing downstream in the intercooler receiving portion bypassing the intercooler is reduced thereby lowering the cooling efficiency of the intercooler to the intake air can be suppressed.

EMBODIMENTS FOR CARRYING OUT INVENTION

Figure 1:
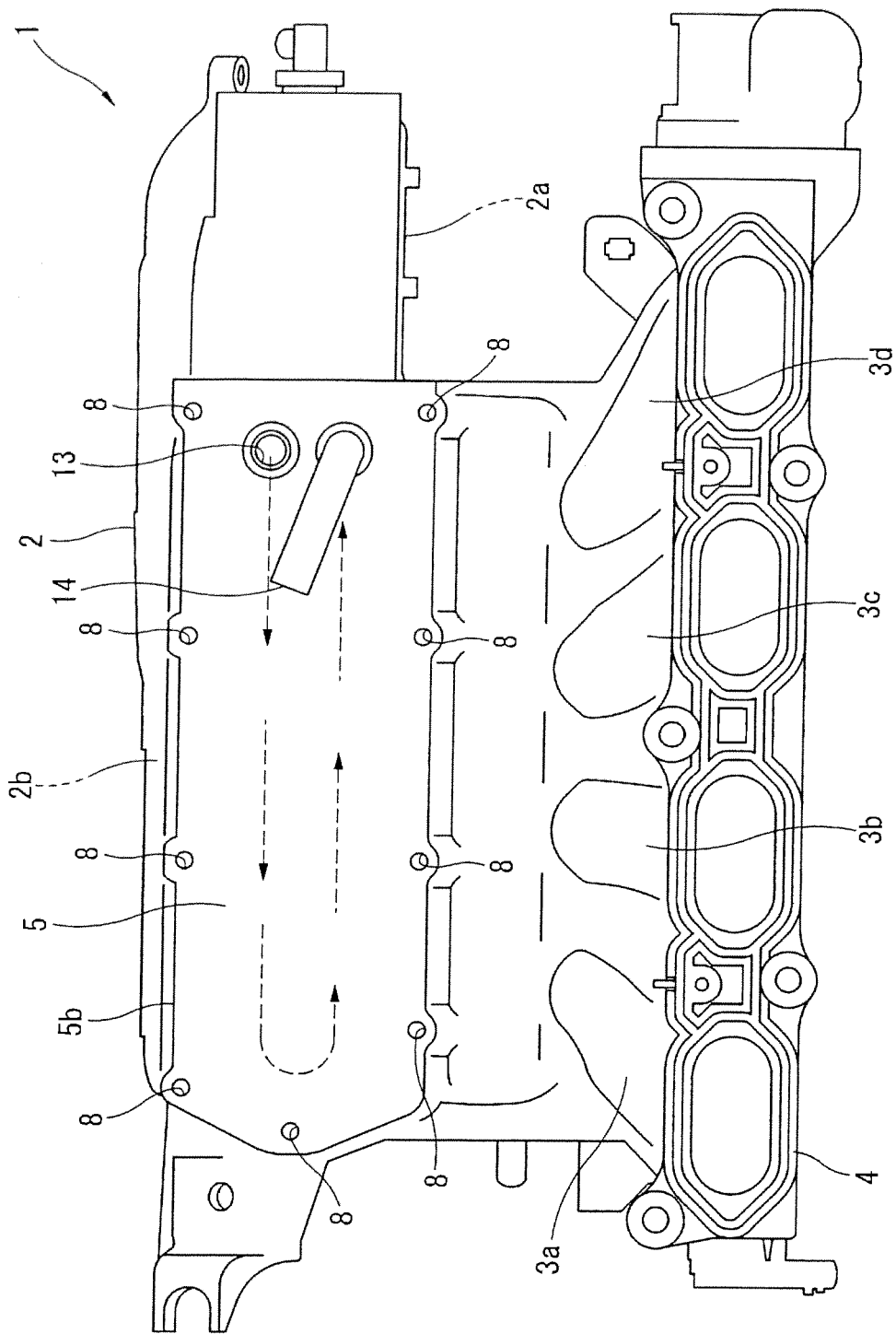
FIG. 1 is an illustration schematically showing an entire construction of an intake manifold of the present invention.
Figure 2:
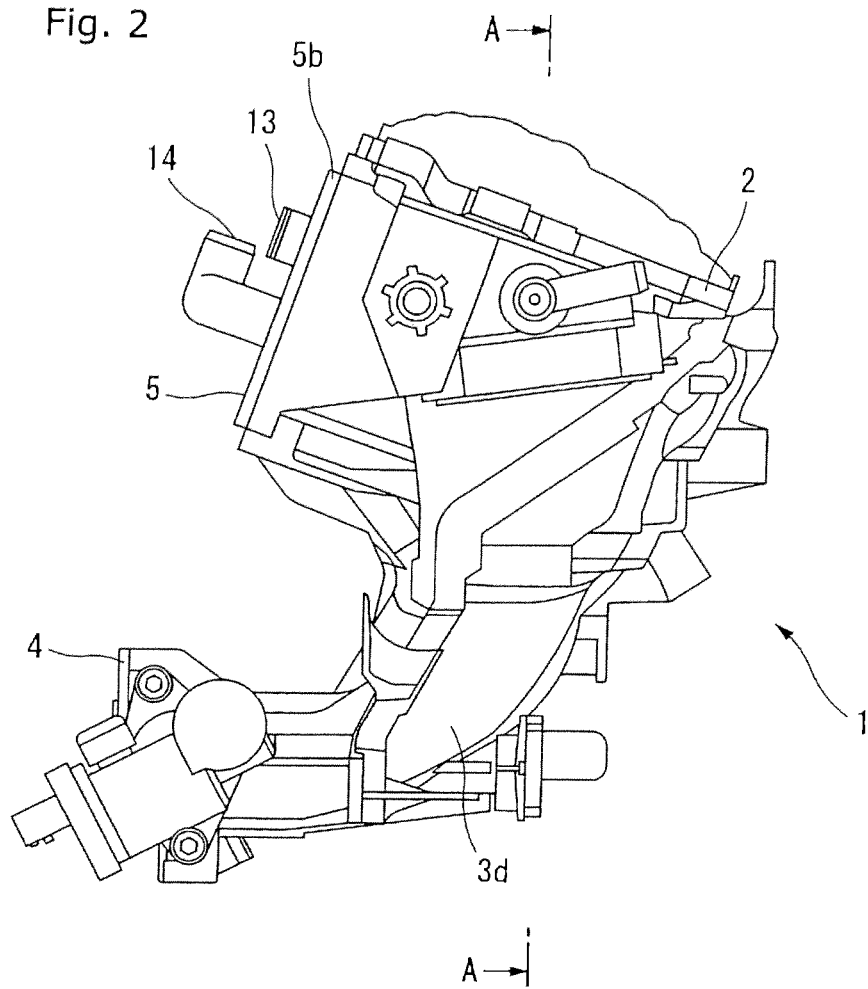
FIG. 2 is a side view of the intake manifold of the present invention.
Figure 3:
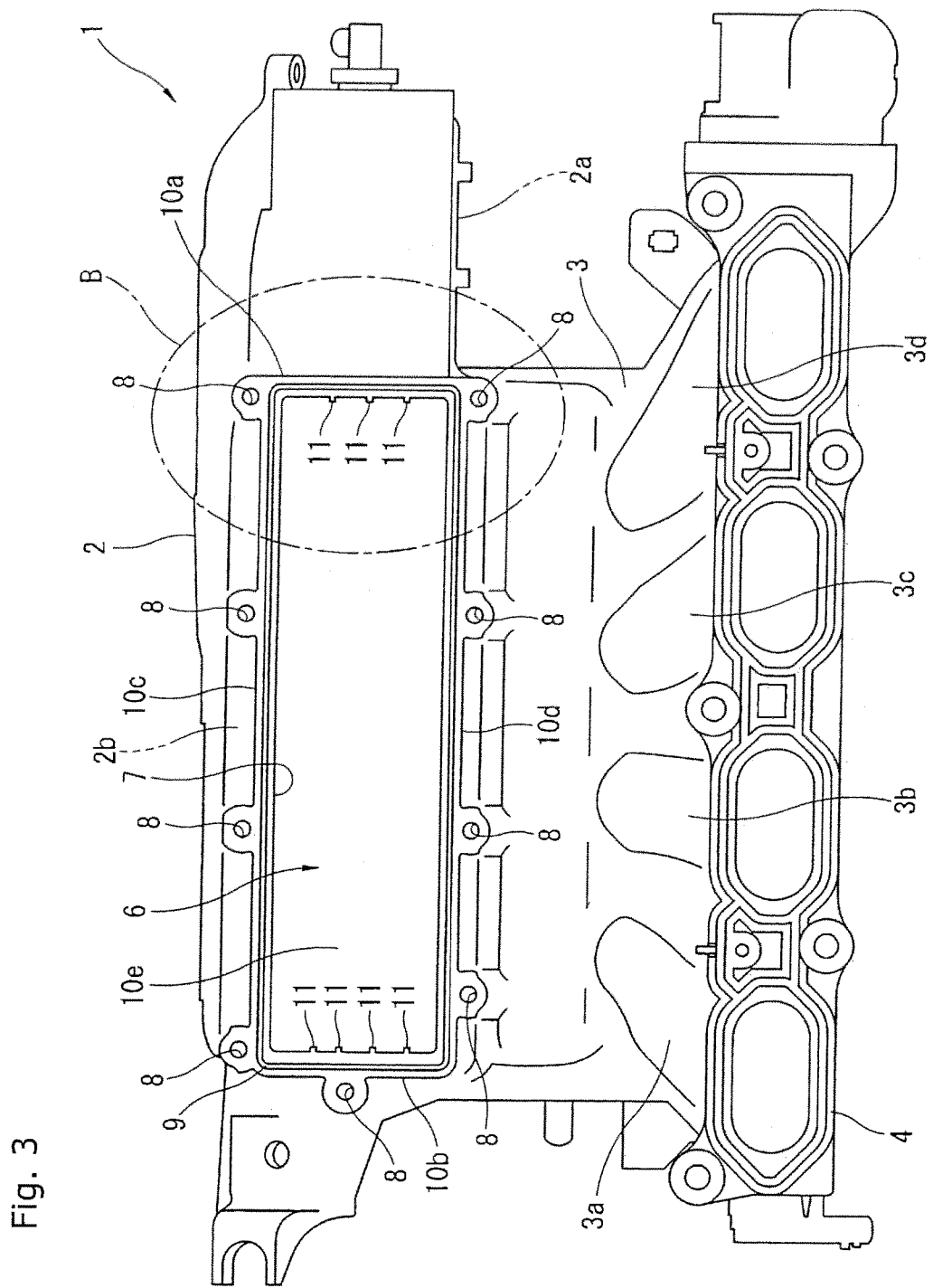
FIG. 3 is an illustration schematically showing a single body of the intake manifold of the present invention.
Figure 4:
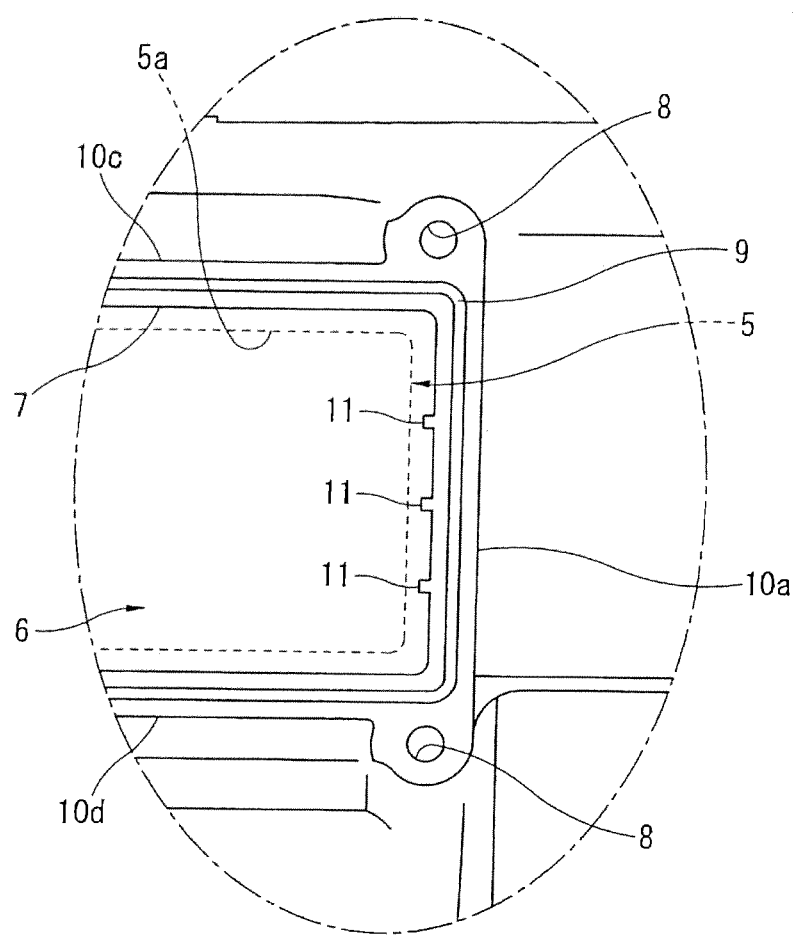
FIG. 4 is an enlarged view of an area B of FIG. 3 which is enclosed by a dashed line.
Figure 5:
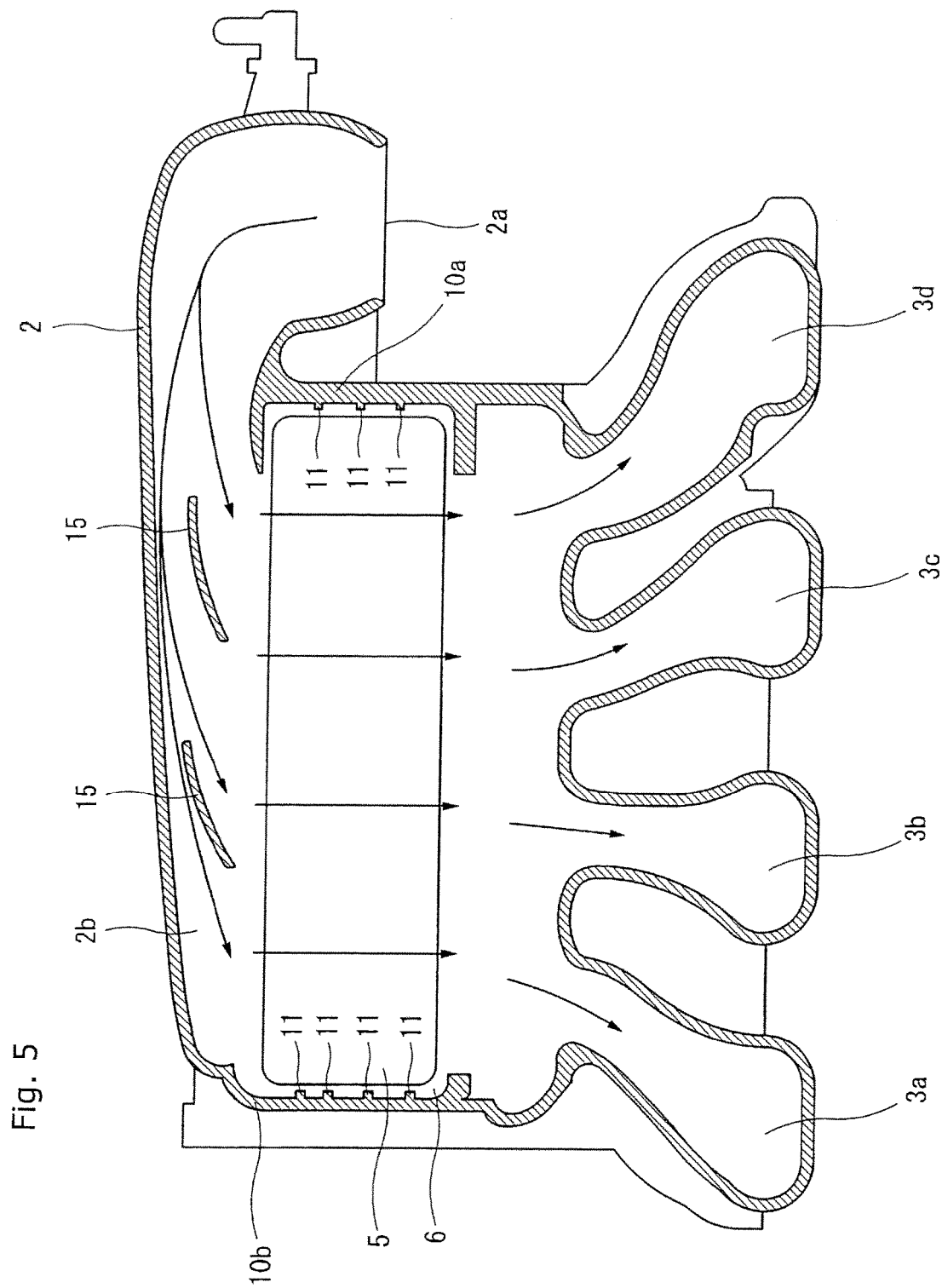
FIG. 5 is a sectional view taken along the line A-A of FIG. 2.

In the following, an embodiment of the present invention will be described in detail with reference to the accompanying drawings. FIGS. 1 and 2 are illustrations schematically showing an entire construction of the intake manifold of the present invention, in which FIG. 1 shows a front view and FIG. 2 shows a right side view. FIG. 3 is an illustration schematically showing a single body of the intake manifold 1, that is, a front view of the single body taken at the time before an intercooler 5 is connected to the intake manifold. FIG. 4 is an illustration showing an enlarged view of an area B of FIG. 3 which is enclosed by a dashed line. FIG. 5 is a sectional view taken along the line A-A of FIG. 2.

The intake manifold 1 is of a type that is applied to an in-line four cylinder internal combustion engine that has a supercharger (not shown) mounted thereto, and the intake manifold is made of resin. As is seen from FIGS. 1 and 2, the intake manifold comprises a collector portion 2 into which intake air is led and a branched passage portion 3 that has four branch passages 3a to 3d through which intake air in the collector portion 2 is distributed to cylinders of the engine, and the intake manifold is fixed to a cylinder head (not shown) of the engine through a flange portion 4 formed at a downstream end of the branched passage portion 3.

The collector portion 2 is formed in a rectangular parallelepiped shape extending along the cylinder line direction (that is, in a right-left direction in FIGS. 1, 3 and 5, or in a direction perpendicular to an exposed surface of FIG. 2), and as is seen from FIGS. 1, 3 and 5, the collector portion comprises an air inlet opening 2a through which intake air is led thereinto, an elongate air introducing passage 2b that is placed at a downstream side of the air inlet opening 2a and extends along the cylinder line direction and an intercooler receiving portion 6 that is placed at a downstream side of the air introducing passage 2b and receives therein a water-cooled type intercooler 5. The intercooler receiving portion 6 is a generally rectangular parallelopiped space and has an exposed opening 7 at an outer wall of the collector portion 2. For example, as is indicated by arrows in FIG. 5, in operation, intake air that is to be fed to the intake manifold 1 from an upstream portion where a throttle valve and its associated parts (not shown) are located is led into the intercooler receiving portion 6 from the air inlet opening 2a through the air introducing passage 2b, and the intake air thus led in the intercooler receiving portion is cooled by the heat-exchange with cooling water that flows in the intercooler 5, and then distributed to the cylinders of the engine through the branch passages 3a to 3d. Indicated by numerals 15 in FIG. 5 are distributing plates that are integrally molded with the collector portion 2 and arranged inclined to the cylinder line direction to lead the intake air in the air introducing passage 2b into the intercooler receiving portion 6 while expanding the flow of the air along the cylinder line direction.

The intercooler 5 generally comprises, for example, a generally rectangular parallelopiped heat exchanging device 5a that is produced by combining a plurality of metal members by brazing or the like and received in the intercooler receiving portion 6 to carry out a heat exchange between the intake air flowing in the collector portion 2 and the cooling water, and a rectangular lid member 5b that is fixed to the heat exchanging device 5a and sized to close the opening 7 of the intercooler receiving portion 6. For installation, the intercooler 5 is inserted into the intercooler receiving portion 6 through the opening 7 from the side of the heat exchanging device 5a, and then the lid member 5b is fixed to the collector portion 2 by bolts (not shown) having a peripheral portion of the lid member 5b put on a peripheral portion of the opening 7. Designated by numerals 8 in FIG. 1 are bolt holes. In a condition wherein the intercooler 5 is fixed to the collector portion 2, airtightness of the opening 7 to the outside is assured due to presence of an endless packing 9 arranged on the peripheral portion of the opening 7.

The intercooler receiving portion 6 is provided by a wall portion 10 that constitutes the collector portion 2, and an inner wall surface of the intercooler receiving portion 6 constitutes an inner wall surface of the wall portion 10.

For preventing the intercooler receiving portion 6 from interfering with the intercooler 5 except the part where the portion 6 is fixed to the collector portion 2, the intercooler receiving portion 6 is previously made somewhat larger than the heat exchanging device 5a of the intercooler 5 considering a deformation of the intake manifold 1 after its molding due to thermal contraction.

Specifically, in order to avoid interference of the heat exchanging device 5a of the intercooler 5 mounted to the collector portion 2 against four wall portions 10a, 10b, 10c and 10d that constitute the periphery of the opening 7 and a wall portion 10e that faces the opening 7, designing is so made that upon installation, a certain clearance is provided between each of these five wall portions 10a to 10e and the heat exchanging member 5a of the intercooler 5.

Although due to the nature of resin by which the intake manifold 1 is produced, deformation of the intake manifold caused by the thermal contraction of the resin is varied depending on various conditions such as the season, whether, shape and thickness, the clearance between the intercooler receiving portion 6 and the heat exchanging device 5a of the intercooler 5 is so set as not to bring about undesired contact or interference between the inter cooler receiving portion 6 and the heat exchanging device 5a even when the deformation exhibits the maximum value due to variation of products at the time of manufacturing and thermal contraction of the resin.

Furthermore, as is seen from FIGS. 3 to 5, of the wall portion 10 constituting the intercooler receiving portion 6, the wall portions 10a and 10b positioned at one and the other ends with respect to the cylinder line direction are formed with a plurality of ribs 11 that are projected toward the heat exchanging device 5a of the intercooler 5. The clearance between the wall portions of the intercooler receiving portion 6 and the intercooler 5 is so determined as not to induce interfere or contact of the leading ends of the ribs 11 with the heat exchanging device 5a of the intercooler 5 even if the intercooler receiving portion 6 is deformed to the maximum degree due to thermal contraction of the wall portions 10a and 10b that have the projected ribs 11. The ribs 11 have each a rectangular cross section and extend in a direction along which the intercooler 5 is moved when the same is put into the intercooler receiving portion from the opening 7. In the embodiment, the wall portion 10a has on its surface three ribs 11 and the wall portion 10b has on its surface four ribs 11. In the intercooler receiving portion 6, the distance between the wall surface of the intercooler receiving portion 6 and the intercooler 5 is so set as not cause interference or contact between the leading ends of the ribs 11 and the heat exchanging device 5a of the intercooler 5 even when the wall portions 10a and 10b where the ribs 11 are projected show the maximum volume change due to the thermal contraction of the like of the wall portions. The ribs 11 are projected ribs each being rectangular in cross section and formed to extend in a direction in which the intercooler 5 is inserted into the opening 7. In the illustrated embodiment, the inner surface of the wall portion 10a is formed with three ribs 11 and the inner surface of the wall portion 10b is formed with four ribs 11.

Designated by numeral 13 in FIGS. 1 and 2 is a cooling water inlet opening through which a cooling water is led into the intercooler 5, and designated by numeral 14 in FIGS. 1 and 2 is a cooling water outlet opening from which the cooling water thus warmed in the intercooler 5 is discharged. As is seen from the arrows in FIG. 1, the cooling water led from the cooling water inlet opening 13 is forced to flow in the intercooler 5 in the cylinder line direction toward the other side (viz., toward the left side in FIG. 1) and thereafter the cooling water is forced to make an U-turning and flow back in the cylinder line direction toward the one side (viz., toward the right side in FIG. 1) and finally, the cooling water is discharged from the cooling water outlet opening 14.

As is mentioned hereinabove, with provision of the ribs 11 on the wall portions 10a and 10b that constitute part of the intercooler receiving portion 6, sections of the wall portions 10a and 10b where root portions of the ribs 11 are provided are increased in mechanical strength, and thus, the deformation of the sections where the root portions of the ribs 11 are provided is suppressed or reduced as compared with that provided when such ribs 11 are not provided to the wall portions. That is, variation of the deformation of the leading ends of the ribs 11 is relatively small as compared with that of the deformation of the sections of the wall portions 10a and 10b where the ribs 11 are not provided.

In case of providing a distance between the wall portions 10a and 10b and the heat exchanging device 5a of the intercooler 5 in order to suppress the interference or contact therebetween even when deformation caused by the thermal contraction or the like appears, providing the wall portions 10a and 10b with such ribs 11 can bring about such a desirable phenomenon that the clearance between the surfaces of the the wall portions 10a and 10b and the heat exchanging device 5a of the intercooler 5 is relatively small as compared with a clearance that would appear when such ribs 11 are not provided to the wall portions 10a and 10b.

That is, by providing the wall portions 10a and 10b with the ribs 11, the clearance between the heat exchanging device 5a of the intercooler 5 in the intercooler receiving portion 6 and the inner surface of the intercooler receiving portion 6 can be minimized by reducing the clearance between the heat exchanging device 5a and the leading ends of the ribs 11 to such a degree as not to induce interference or contact between them. With such clearance, the air flow resistance of the clearance can be increased, so that the amount of intake air that bypasses the heat exchanging device 5a of the intercooler 5 and flows downstream in the intercooler receiving portion 6 toward the branched passage portion 3 can be reduced and thus, undesired phenomenon in which the cooling efficiency of the intercooler 5 to the intake air is lowered is suppressed.

Furthermore, with presence of the ribs 11, the sections of the wall portions 10a and 10b where the root parts of the ribs 11 are provided can have an increased rigidity, prediction of the scale of deformation due to thermal contraction of the ribs 11 and the sections of the wall portions 10a and 10b where the ribs 11 are provided is easy as compared with prediction of the scale in case where such ribs 11 are not provided to the wall portions 10a and 10b, so that a dimensional control for the clearance between the heat exchanging device 5a of the intercooler 5 and the wall portions 10a and 10b is facilitated.

Figure 6:
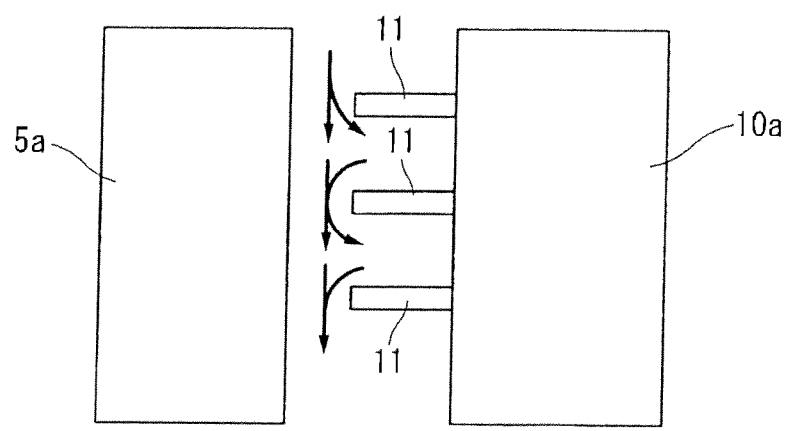
FIG. 6 is an illustration schematically showing ribs and directions in which intake air flows.

The air flow resistance at the space between the wall portions 10a and 10b and the heat exchanging device 5a is increased due to provision of the ribs 11 on the wall portions 10a and 10b as compared with that in case wherein the ribs 11 are not provided to the wall portions 10a and 10b. Now, as is seen from FIG. 6, if the ribs 11 are arranged to block the flow of intake air in the space between the wall portion 10a and the heat exchanging device 5a, the air flow resistance in the clearance between the wall portion 10a and the heat exchanging device 5a can be more effectively increased. This increase of air flow resistance is caused by increase in intake air flow velocity at the time when the intake air flows in the clearance between the leading ends of the ribs 11 and the heat exchanging device 5a, an energy loss caused when the intake air is forced to flow in a narrower path at the positions of the ribs 11 and another energy loss caused when the intake air is forced to flow in a broader path after passing the ribs 11. In case of FIG. 6, the ribs 11 are arranged to extend perpendicular to the flow of intake air in the clearance between the wall portion 10a and the heat exchanging device 5a, and thus, for the purpose of increasing the air flow resistance in the clearance between the wall portion 10a and the heat exchanging device 5a, such arrangement is more advantageous than an arrangement in which such ribs 11 don't extend perpendicular to the flow of intake air in the clearance between the wall portion 10a and the heat exchanging device 5a.

The collector portion 2 is shaped elongate extending in the cylinder line direction and the air inlet opening 2a is placed at one end part in the cylinder line direction, and thus, the intake air flowing in the intercooler receiving portion 6 tends show a larger amount at a far position (viz., the other end part in the cylinder line direction) from the air inlet opening 2a than that flowing at a position (viz., the one end part in the cylinder line direction) near the air inlet opening 2a, due to an inertia of the flow of intake air that is just led into the portion 6 from the air inlet opening 2a. Accordingly, in the clearance between the heat exchanging device 5a of the intercooler 5 and the wall portion 10b, a large amount of intake air tends to flow as compared with the intake air that flows in the clearance between the heat exchanging device 5a and the wall portion 10a. Thus, it is important to control the clearance between the heat exchanging device 5a and the wall portion 10b to take a small value, and thus, in the embodiment, increased number of ribs 11 are provided for the wall portion 10b. Because the wall portion 10a is placed nearer to the air inlet opening 2a than the other wall portion 10b, the wall portion 10a tends to have a thicker construction due to the nature of plastic molding. Thus, even if the number of the ribs 11 provided at the wall portion 10a increases, the dimensional and precisional control of that wall portion 10a at the time when thermal contraction and the like take place is difficult. In view of this, in case of providing the wall portions 10a and 10b with a plurality of ribs 11 respectively, it is preferable that the number of the ribs 11 provided to the wall portion 10b that is far from the air inlet opening 2a is larger than that of the ribs 11 provided to the wall portion 10a that is near the air inlet opening 2a.

The invention claimed is:

1. A resin-made intake manifold having an intercooler receiving portion for receiving therein an intercooler, wherein:
   the intercooler receiving portion is formed in a rectangular parallelopiped shape extending along a cylinder line direction of an engine and has an opening exposed to an outside of the intake manifold, one end part of the intercooler receiving portion being placed in the vicinity of an air inlet opening formed in the intake manifold,
   wall portions defining the intercooler receiving portion are placed at the one end part and another end part of the intercooler receiving portion in the cylinder line direction, and the wall portions are formed, on inner surfaces thereof, with ribs that project toward an inside of the intercooler receiving portion, the ribs being structured to avoid contact of the inner surfaces with the intercooler,
   wherein a clearance is formed between the intercooler and leading ends of the ribs to avoid contact between the intercooler and the leading ends of the ribs.

2. The resin-made intake manifold as claimed in claim 1, in which the opening of the intercooler receiving portion is closed by the intercooler that is received in the intercooler receiving portion.

3. The resin-made intake manifold as claimed in claim 1, wherein:
   the intake manifold is of a type including a collector portion and a branched passage portion having a plurality of branch passages through which intake air in the collector portion is distributed to cylinders of the engine, and
   the intercooler receiving portion is formed in the collector portion.

4. The resin-made intake manifold as claimed in claim 1, wherein:
   the wall portions include a wall portion placed at the another end part in the cylinder line direction, the wall portion having, on an inner surface of the wall portion, more ribs than another wall portion placed at the one end part of the intercooler receiving portion.

5. The resin-made intake manifold as claimed in claim 1, in which the intercooler is fixed to a portion of the intercooler receiving portion.

6. The resin-made intake manifold as claimed in claim 1, in which the clearance is set to avoid contact between the intercooler and leading ends of the ribs even when the resin-made intake manifold exhibits deformation due to thermal contraction.

7. The resin-made intake manifold as claimed in claim 1, wherein the intercooler and the ribs are out of contact with each other in a longitudinal section of the intercooler, the longitudinal section passing through the ribs.

* * * * *